(12) United States Patent
Frei et al.

(10) Patent No.: US 8,050,484 B2
(45) Date of Patent: Nov. 1, 2011

(54) METHOD AND SYSTEM FOR IMAGE RECOGNITION FOR AIDING THE VISUALLY IMPAIRED

(75) Inventors: Joseph B. Frei, Hopewell Junction, NY (US); Edward E. Kelley, Wappingers Falls, NY (US); Franco Motika, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 1122 days.

(21) Appl. No.: 11/833,547

(22) Filed: Aug. 3, 2007

(65) Prior Publication Data

US 2009/0034802 A1 Feb. 5, 2009

(51) Int. Cl.
*G06K 9/00* (2006.01)
(52) U.S. Cl. ...................................................... 382/138
(58) Field of Classification Search .................. 382/135, 382/137, 138, 139, 140, 181
See application file for complete search history.

(56) References Cited

U.S. PATENT DOCUMENTS

| | | | | |
|---|---|---|---|---|
| 4,337,864 A * | 7/1982 | McLean | | 209/534 |
| 4,563,771 A | 1/1986 | Gorgone et al. | | |
| 4,793,812 A | 12/1988 | Sussman et al. | | |
| 5,185,515 A * | 2/1993 | Nishibe | | 235/379 |
| 5,692,068 A | 11/1997 | Bryenton et al. | | |
| 6,321,980 B1 * | 11/2001 | Yazumi et al. | | 235/379 |
| 6,336,586 B1 * | 1/2002 | Shriver | | 235/380 |
| 7,124,934 B2 | 10/2006 | Graham | | |
| 2006/0098900 A1 | 5/2006 | King et al. | | |

FOREIGN PATENT DOCUMENTS

| | | |
|---|---|---|
| CA | 1282171 | 3/1991 |
| CA | 2257590 A1 | 6/2000 |
| DE | 20207900 | 10/2002 |
| WO | 9325980 | 12/1993 |

OTHER PUBLICATIONS

Mobile OCR, Face and Object Recognition for the Blind, [online]; [retrieved on Mar. 19, 2007]; retrieved from the internet http://www.seeingwithsound.com/ocr.htm.
Cash is in the Eye of the Beholder, [online]; [retrieved on Mar. 19, 2007]; retrieved from the internet http://www.citybeat.com/2006-12-20/inmyview.shtml.

* cited by examiner

*Primary Examiner* — Tom Y Lu
(74) *Attorney, Agent, or Firm* — Cantor Colburn LLP

(57) ABSTRACT

A method for tracking paper currency in a holder, includes: scanning paper currency deposited or removed from a holder; determining the total number of each individual denomination of paper currency contained within the holder based on the scanned paper currency deposited and removed from the holder; recording the total number of each individual denomination of paper currency; determining the total value of the paper currency within the holder; outputting the denomination of paper currency when the paper currency is scanned during depositing or removal from the holder; outputting the recorded number of each individual denomination of paper currency and the total value of the currency within the holder; and wherein the recorded number of each individual denomination of paper currency and the total value of the currency within the holder is dynamically tabulated based on the scanning of paper currency deposited or removed from the holder.

20 Claims, 2 Drawing Sheets

METHOD AND SYSTEM FOR IMAGE RECOGNITION FOR AIDING THE VISUALLY IMPAIRED

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates generally to an image recognition system for aiding visually impaired persons, and more particularly to a method and system for a wallet or purse that dynamically inventories paper currency, and provides visually impaired individuals information on the contents of the wallet or purse.

2. Description of the Related Art

A major concern for visually impaired individuals is their inability to distinguish between various denominations of paper currency (also referred to as paper bills, bills, money). Visually impaired individuals often resort to rudimentary systems such as folding their paper bills based on the face amount, such as $5 in half horizontally, $10 in half vertically, $20 folded in fourths, etc., or by placing various bill denominations in various compartments of their wallets or purse. However, these methods still require sighted individuals to point out what the values of the bills are, and leave the visually impaired person dependent on sighted individuals. In addition, in public where exchanges of money occur, the visually impaired are at the mercy of the other party in the transaction to furnish the correct change. The intentional or unintentional mistakes incurred in these monetary exchanges causes financial and emotional hardship.

SUMMARY OF THE INVENTION

Embodiments of the present invention include a method and system for tracking paper currency in a holder, the method includes: scanning, using a scanning device, paper currency deposited into a holder; scanning, using the scanning device, paper currency removed from the holder; determining, using a processing device in signal communication with the scanning device, the total number of each individual denomination of paper currency contained within the holder based on the difference between scanned paper currency deposited and removed from the holder; recording the total number of each individual denomination of paper currency; determining the total value of the paper currency within the holder based on the recorded number of each individual denomination of paper currency contained in the holder; outputting the denomination of paper currency when the paper currency is scanned during depositing or removal from the holder; outputting the recorded number of each individual denomination of paper currency and the total value of the currency within the holder; and wherein the recorded number of each individual denomination of paper currency and the total value of the currency within the holder is dynamically tabulated based on the scanning of paper currency deposited or removed from the holder.

A system for tracking paper currency, the system includes: a holder; a scanning device configured to determine the denomination of paper currency operably coupled to the holder; a central processor operably coupled to the scanning device; a memory device operably coupled to the CPU; an output device operably coupled to the CPU; wherein the CPU is configured with software for determining the total number of each individual denomination of paper currency contained within the holder based on the difference between scanned paper currency deposited and removed from the holder; wherein the total number of each individual denomination of paper currency is recorded in the memory; wherein the CPU determines the total value of the paper currency within the holder based on the recorded number of each individual denomination of paper currency contained in the holder; wherein the output device provides informational output on the denomination of paper currency when the paper currency is scanned during depositing or removal from the holder; wherein the output device provides informational output on the recorded number of each individual denomination of paper currency and the total value of the currency within the holder; and wherein the recorded number of each individual denomination of paper currency and the total value of the currency within the holder is dynamically tabulated by the CPU based on the scanning of paper currency deposited or removed from the holder.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, a solution is technically achieved for a method and system for a wallet or purse that dynamically inventories paper currency, and provides the visually impaired with information on the wallet's or purse's contents.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

Embodiments of the invention provide a method and system for a wallet or purse that dynamically inventories paper currency, and provides the visually impaired with information on the contents of a wallet, purse or billfold (referred to more generally hereinafter as a "holder").

Embodiments of the invention are configured to track currency statistics and totals (i.e., to inventory the total number bills, the number of bills by denomination, the total value of the bills) in the holder. In addition, embodiments of the invention are configured to announce or display how much money was removed by denomination and value, how much has been added by denomination and value, and how much money remains in the wallet by denomination and value.

Embodiments of the invention utilize electronic scanning devices at the openings of the wallets, purses, or billfolds to identify the paper currency as the currency is inserted or removed. The scanning devices may be equipped with pattern recognition or optical character recognition (OCR) properties. The scanning devices may be equipped with automatic feeds for insertion or removal of bills. Alternatively, the user may be required to manually pass each bill by the scanner as they insert or remove currency from the holder.

Embodiments of the invention provide the visually impaired with information on the contents of a holder via audio through a speaker or earpiece. User defined codes may be substituted for currency values and totals for security purpose when a speaker is used, and the information is also available to others in the immediate vicinity. For example names of fruits, cities, or people may be substituted for currency values. The earpiece may be electrically connected via a wire to the holder, or via a wireless radio frequency (RF) link. Bluetooth headsets or earpieces commonly used in conjunction with cell phones may act as a wireless interface to the wallet, purse, or billfold. For an individual who is both sight and hearing impaired, tactile feedback may be provided to the user concerning monetary balances and transactions.

Figure 1:
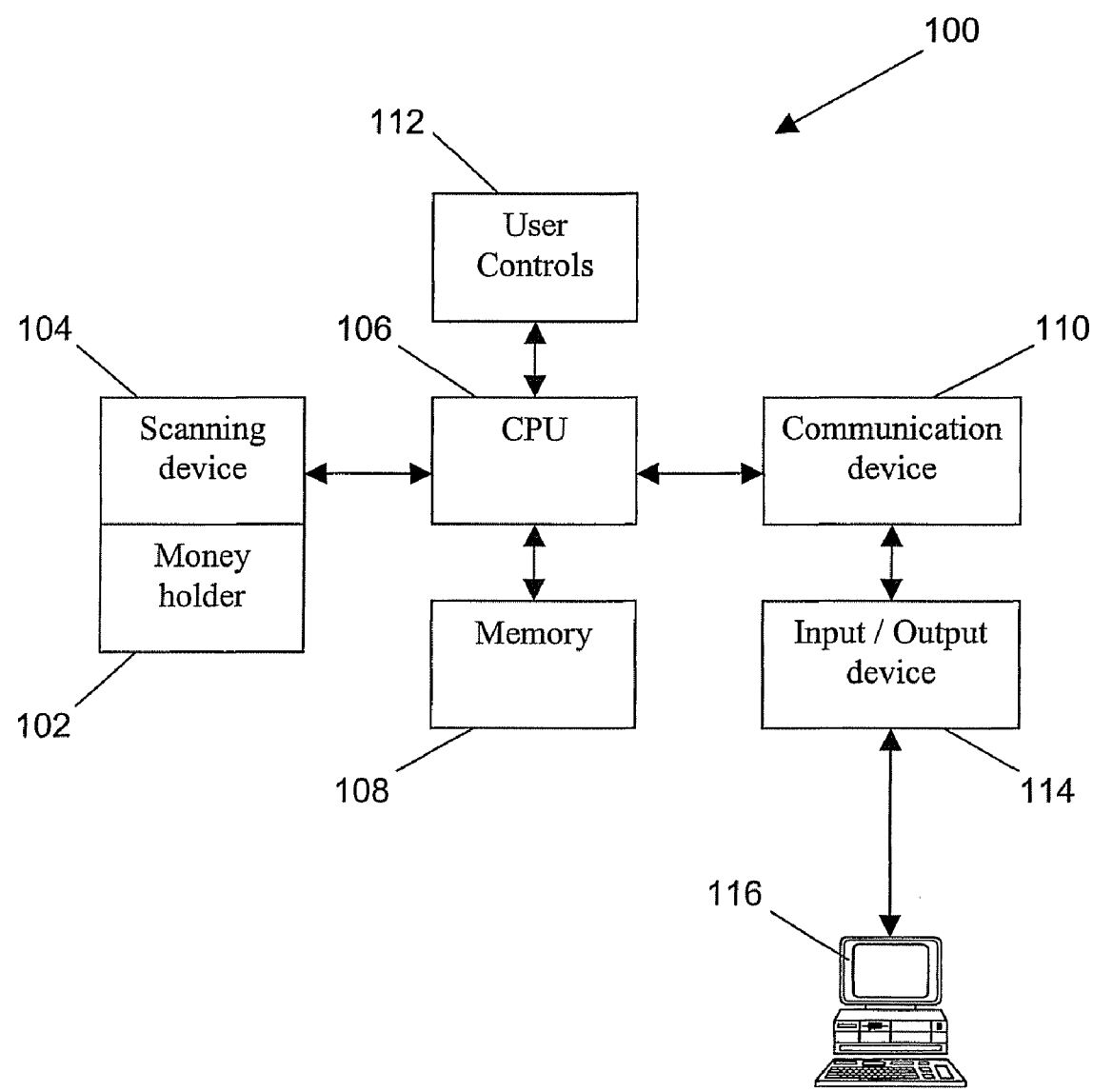
FIG. 1 is a block diagram of a system for implementing embodiments of the invention.

FIG. 1 is a block diagram of a system 100 to implement embodiments of the invention. A money holder 102 is configured with a scanning device 104, a central processing unit (CPU) 106, memory 108, a communications device 110, user control interface 112, and an input/output device 114. The money holder 102 may be a wallet, purse, billfold, money belt, or any wearable storage, for example. The scanning device 104 may be equipped with automatic feeds or motorized rollers for insertion or removal of bills. Alternatively, the user manually passes bills past the scanner during insertion or removal of the bills. The scanning device 104 is in operable signal contact with the CPU 106, and utilizes pattern recognition software, and OCR technologies to record the type or amount of currency being added or removed from the money holder 102.

The CPU 106 tracks currency movements within the system 100, and tabulates currency statistics and totals that are stored and dynamically updated in the memory 108. The CPU 106 is in operable signal contact with the communications device 110. The communications device 110 provides audio or tactile outputs via the input/output device 114 to the user based on information that is requested via the controls 112. The communications device 110 may be equipped with a voice synthesizer or speech processor to enunciate currency statistics and totals. The communication device 110 may be configured with an input/output device 114 configured as an external speaker, a wired earpiece, or wireless earpiece. The input/output device 114 may also provide vibratory tactile signals indicative of currency statistics and totals. Furthermore, the system 100 can interface with an external computing device 116 for user record keeping and for system 100 configuration. In embodiments of the invention, the memory 108 may also be removed from the system 100 in the form of memory cards or sticks.

The user interface controls 112 may have a series of buttons, tactile switches, or touch controls for implementing user requests. For example, a series of buttons representing individual currency denominations may be present, as well as buttons requesting a deposit or withdrawal of currency. General request buttons for currency statistics and totals may also be available. The amount of currency to be withdrawn may also be requested with a keypad. The user interface may also recognize preprogrammed (user voice recognition) user voice commands to dispense a requested amount of currency.

Figure 2:
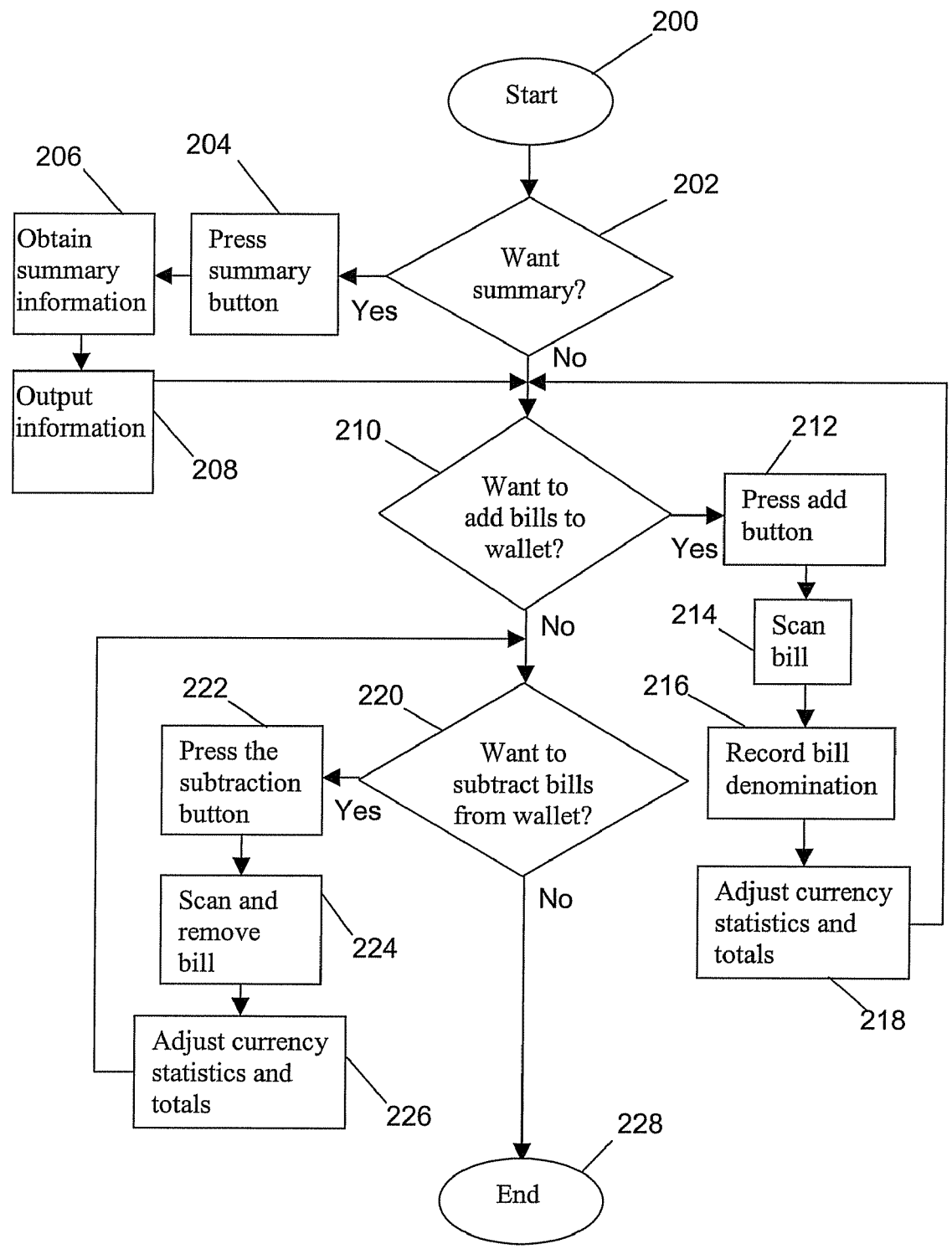
FIG. 2 is a flow diagram illustrating a process for utilizing embodiments of the invention.

FIG. 2 illustrates a flow diagram of a process for utilizing embodiments of the invention. The process starts (block 200) with the user requesting a summary (block 202 is Yes) of what paper currency is being held in their wallet (money holder 102). The user initiates the summary request by pressing a summary request button (block 204) found within the user interface controls 112 of FIG. 1. Summary information of the wallets contents is obtained (block 206) from memory 108 by the CPU 106 and outputted (block 208) via the communication device 110 and input/output device 114. If the user wants to add paper currency to their wallet (Block 210 is Yes) they press the add button (block 212) found within the user interface controls 112. The bill is scanned (block 214) as it is placed in the wallet, and the bill's denomination is recorded (block 216) in memory 108. The CPU 106 adjusts the currency statistics and totals (block 218) and places the updated values in memory 108. If the user wants to remove paper currency from their wallet (Block 220 is Yes) they press the subtraction button (block 222) found within the user interface controls 112. The bill is scanned (block 224) as it is removed from the wallet. The CPU 106 adjusts the currency statistics and totals (block 226) and places the updated values in memory 108. The process ends (block 228) after a user defined timeout period.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiments to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for tracking paper currency in a holder, the method comprising:

scanning, using a scanning device, paper currency deposited into a holder;

scanning, using the scanning device paper currency removed from the holder;

determining, using a processing device in signal communication with the scanning device, the total number of each individual denomination of paper currency contained within the holder based on the difference between scanned paper currency deposited and removed from the holder;

recording, using the processing device, the total number of each individual denomination of paper currency;

determining, using the processing device, the total value of the paper currency within the holder based on the recorded number of each individual denomination of paper currency contained in the holder;

outputting the denomination of paper currency when the paper currency is scanned during depositing or removal from the holder;

outputting the recorded number of each individual denomination of paper currency and the total value of the currency within the holder; and wherein the recorded number of each individual denomination of paper currency and the total value of the currency within the holder is dynamically tabulated based on the scanning of paper currency deposited or removed from the holder.

2. The method of claim 1, wherein the holder comprises at least one of a wallet, a purse, and a billfold.

3. The method of claim 1, wherein the scanning device comprises a scanner reader and the scanning is conducted with the manual insertion and removal of the paper currency past the scanner reader.

4. The method of claim 1, wherein the scanning device comprises a scanner reader and the scanning is conducted with an automatic insertion and removal of the paper currency past the scanner reader in response to a command to deposit or remove the paper currency.

5. The method of claim 4, wherein the command to remove the paper currency is based on a specified total value of paper currency to be removed from the holder.

6. The method of claim 4, wherein the command to remove the paper currency is based on a specified individual denomination or combination of paper currency.

7. The method of claim 1, wherein the scanning device is configured with pattern recognition.

8. The method of claim 1, wherein the scanning device is configured with optical character recognition (OCR).

9. The method of claim 1, wherein the outputting is carried out with audio signals through a speaker or an earpiece.

10. The method of claim 1, wherein the outputting is carried out a synthesized voice through a speaker or an earpiece.

11. The method of claim 10, wherein the synthesized voice encodes the output with user defined words that are associated with specific denominations of the paper currency.

12. The method of claim 1, wherein the output is wirelessly transmitted to at least one of a remote speaker, earpiece, headset, or mobile communication device via radio frequency (RF) link.

13. The method of claim 12, wherein the output is wirelessly transmitted via a Bluetooth transmission.

14. The method of claim 1, wherein the output is provided via vibratory tactile signals.

15. A system for tracking paper currency, the system comprising:

a holder;

a scanning device operably coupled to the holder, the scanning device configured to determine the denomination of paper currency deposited into and removed from the holder;

a central processor operably coupled to the scanning device;

a memory device operably coupled to the CPU;

an output device operably coupled to the CPU;

wherein the CPU is configured with software for determining the total number of each individual denomination of paper currency contained within the holder based on the difference between scanned paper currency deposited and removed from the holder;

wherein the total number of each individual denomination of paper currency is recorded in the memory;

wherein the CPU determines the total value of the paper currency within the holder based on the recorded number of each individual denomination of paper currency contained in the holder;

wherein the output device provides informational output on the denomination of paper currency when the paper currency is scanned during depositing or removal from the holder;

wherein the output device provides informational output on the recorded number of each individual denomination of paper currency and the total value of the currency within the holder; and wherein the recorded number of each individual denomination of paper currency and the total value of the currency within the holder is dynamically tabulated by the CPU based on the scanning of paper currency deposited or removed from the holder.

16. The system of claim 15, wherein the holder comprises at least one of a wallet, a purse, and a billfold.

17. The system of claim 15, wherein the scanning devices are configured for automated insertion and removal of the paper currency in response to a command to deposit or remove the paper currency; and wherein the removal command is either based on a specified total value of paper currency to be removed from the holder, or on a specified individual denomination or combination of paper currency.

18. The system of claim 17, wherein the commands are voice commands that are recognized by a voice recognition device preprogrammed with a specified user voice; and wherein the voice recognition device is operably coupled to the CPU.

19. The system of claim 15, wherein the scanning device is configured with at least one of the following: pattern recognition and optical character recognition (OCR).

20. The system of claim 15, wherein the output device provides informational output in at least one of the following signal formats: audio, verbal and vibratory tactile;

wherein the outputted audio and verbal signals are provided through at least one of the following: a speaker, a headset, an earpiece, and a mobile communications device; and wherein the speaker, headset and earpiece are wired or wirelessly connected to the output device.

* * * * *